US00RE35589E

United States Patent [19]

Fisch

[11] E Patent Number: Re. 35,589

[45] Reissued Date of Patent: Aug. 19, 1997

[54] BIOLOGICAL ASSEMBLY

[76] Inventor: Harry Fisch, 2727 Palisade Ave., Bronx, N.Y. 10463

[21] Appl. No.: 520,524

[22] Filed: Aug. 29, 1995

Related U.S. Patent Documents

Reissue of:

[64] Patent No.: 5,349,436
Issued: Sep. 20, 1994
Appl. No.: 984,152
Filed: Dec. 2, 1992

[51] Int. Cl.[6] ..... G02B 21/34

[52] U.S. Cl. ..... 356/246; 356/39; 359/398

[58] Field of Search ..... 356/246, 39; 359/396, 359/397, 398

[56] References Cited

U.S. PATENT DOCUMENTS

| | | | |
|---|---|---|---|
| D. 227,360 | 6/1973 | Lou . | |
| D. 239,548 | 4/1976 | Schiff et al. . | |
| D. 258,388 | 2/1981 | Parker . | |
| D. 262,057 | 11/1981 | Parker . | |
| D. 273,898 | 5/1984 | Valencia . | |
| D. 274,261 | 6/1984 | Valencia . | |
| D. 277,699 | 2/1985 | Valencia . | |
| 1,474,812 | 11/1923 | Brooker | 359/398 |
| 2,041,290 | 5/1936 | Jackson . | |
| 2,302,830 | 11/1942 | Axelrad . | |
| 3,005,375 | 10/1961 | Sherman . | |
| 3,141,548 | 7/1964 | Newby . | |
| 3,736,042 | 5/1973 | Markovits et al. . | |
| 3,770,477 | 11/1973 | Weichselbaum . | |
| 3,777,283 | 12/1973 | Elkins . | |
| 3,829,216 | 8/1974 | Persidsky . | |
| 3,961,346 | 6/1976 | White . | |
| 3,990,850 | 11/1976 | Friedman et al. . | |
| 4,190,314 | 2/1980 | Goldsmith | 359/397 |
| 4,387,972 | 6/1983 | Valencia | 356/244 |
| 4,911,782 | 3/1990 | Brown . | |

OTHER PUBLICATIONS

Adams, R.L.P., "Laboratory Techniques in Biochemistry and Molecular Biology," Second Revised Edition, 1990 (no month) pp. 122–127.

*Primary Examiner*—Richard A. Rosenberger
*Attorney, Agent, or Firm*—Sprung Horn Kramer & Woods

[57] ABSTRACT

A biological assembly for effecting the examination of a sample in a liquid medium under magnification. The assembly includes a transparent slide with a sample chamber and an immediately adjacent overflow chamber formed on one main surface by a thin film. The sample chamber is receptive of a sample in a liquid medium. transparent slide, having a pattern for aligning it with the sample chamber, is disposed over the sample chamber. The transparent slide includes a grid etched into the lower surface thereof to enable the counting cells under magnification.

29 Claims, 4 Drawing Sheets

BIOLOGICAL ASSEMBLY

Matter enclosed in heavy brackets [ ] appears in the original patent but forms no part of this reissue specification; matter printed in italics indicates the additions made by reissue.

BACKGROUND OF THE INVENTION

The present invention is directed to a biological assembly and in particular to a slide and slide cover for use in biological studies.

It is often necessary to examine biological material in order to make quantitative determinations relating thereto. For example, a semen sample may require microscopic study to determine the sperm count in the liquid medium of the sample being observed.

Conventionally, there have been two methods for estimating the number of cells in a suspension. One method uses a hemocytometer wherein the number of cells in a given volume is counted by direct microscopic examination. Another method is the use of an electronic counter wherein the cells of a given volume of a suspension are drawn through an orifice and registered electronically.

The hemocytometer comprises a slide and a precision ground cover slip which covers two ruled areas which are ruled in the form of grids. When the cover slip is pressed down on the slide, a chamber is formed therebetween. A drop of cell suspension is placed at the two edges of the cover slip so that the suspension flows into the chambers by capillary action. Other chambers of this type are known as the Horwell Chamber, the Makler chamber and the Hausser Chamber. These devices must be ground to great precision and thus are expensive to make and are accordingly non-disposable. They are, therefore, cleaned after each use so that they can be reused.

U.S. Pat. No. 4,911,782 disclosed a biological slide assembly which enables a fixed volume of sample and liquid medium to be received in a chamber by capillary action in order to be observed under a microscope. The microscope must include a reference grid in the ocular, which is divided into 100 squares, so that the cell count in a representative one of the squares can be obtained by a human observer and used to approximate the total number of cells within the grid. While this device is disposable, it is complex in design and difficult to use in practice.

SUMMARY OF THE INVENTION

The main object of the present invention is to overcome the disadvantages of the prior art and to provide a biological assembly, which is simple in design, easy to use and inexpensive to make so that it is easily disposable after use. These and other features and advantages of the present invention are achieved in accordance with the present invention by a biological assembly for effecting the examination of a sample in a liquid medium under magnification, comprising a transparent substrate having a first main surface, and means forming at least one sample camber and an immediately adjacent overflow chamber on the first main surface and receptive of a sample in a liquid medium, said means comprising a thin film having for each sample chamber and over chamber, means defining a first opening therein corresponding to the sample chamber and means defining a second opening surrounding the first opening and corresponding to the overflow chamber, wherein the first and second openings form a separating wall of thin film therebetween.

The substrate of the biological assembly preferably is a slide, preferably made of transparent glass and which has a thin film of photoresist, epoxy or hydrophobic ink on the upper surface thereof.

The thin film forms a sample chamber which is preferably in the form of a circular or elliptical cylinder having the height of the thin film itself. Immediately adjacent to the sample chamber is an overflow chamber. The overflow chamber in one preferred embodiment is toroidal and coaxial to the sample chamber and separated by a cylindrical wall of thin film. In another preferred embodiment the sample chamber is circular or elliptical and the outer edge of the overflow chamber is rectangular or square.

The thin film is preferably from 5 to 75 μm in height, more preferably 10, 20 or 50 μm. The sample chamber preferably has a volume of 2 to 15 μl, and thus when the diameter of the circular sample chamber is 1.6 cm and the height is 20 μm, the volume is 4 μl.

In accordance with the present invention, each slide can have one or a plurality of sample chambers and associated overflow chambers disposed therearound. Most preferably, the slide will have from one to three sample chambers and overflow chambers.

The biological assembly according to the present invention further comprises a slide cover having a substrate which is preferably made of transparent glass and which is superposed on the slide to cover each sample chamber and overflow chamber.

In accordance with the present invention, the slide cover preferably has a pattern of thin film on the surface opposite that which covers the sample chamber, the pattern demarcating an area so as to enable that area to be aligned within the sample chamber. In a particularly preferred embodiment of the present invention, the pattern on the slide cover is identical in configuration to that of the wall separating the overflow chamber from the sample chamber.

The slide cover also preferably includes a grid formed in the surface of the slide cover which is closest to superposed on the sample chamber so as to be as close as possible to the sample in the liquid medium that is being observed. The grid is preferably 10×10 boxes of 0.1 mm on a side. The grid is disposed within the area demarcated by the pattern. In a particularly advantageous embodiment of the invention, the grid is almost invisible to the naked eye, so the pattern surrounding it is an indication to the user of the location of the grid.

In another embodiment of the present invention, the slide cover can be used with conventional slides, that is, slides other than that of the present invention. In a particularly advantageous embodiment of this invention, the slide cover has a thin film pattern on one main surface demarcating an area and spacing means composed of thin film on the surface of the slide cover which faces the slide to space the grid by a fixed distance form the upper surface of the slide to enable the grid to be in contact with a sample which is disposed on the slide surface between the slide and the slide cover. The thin film is disposed outside the area demarcated by the pattern and preferably spaces the grid from the surface of the slide by 10, 20 or 50 μm.

In this way, the slide cover according to the present invention, can be used with standard slides which have no chambers formed thereon.

These and other features of the present invention will be described hereinafter with reference to the foregoing detailed description taken with the attached drawings, wherein

BRIEF DESCRIPTION OF THE DRAWINGS

FIG. 1b is a sectional view taken along line Ib—Ib in FIG. 1a;

FIG. 2a is a perspective view of the upper surface of one embodiment of the slide cover shown in FIG. 1a;

FIG. 2b is a perspective view of the under surface of one embodiment of the slide cover shown in FIG. 1a;

DETAILED DESCRIPTION OF THE INVENTION

Figure 1A:
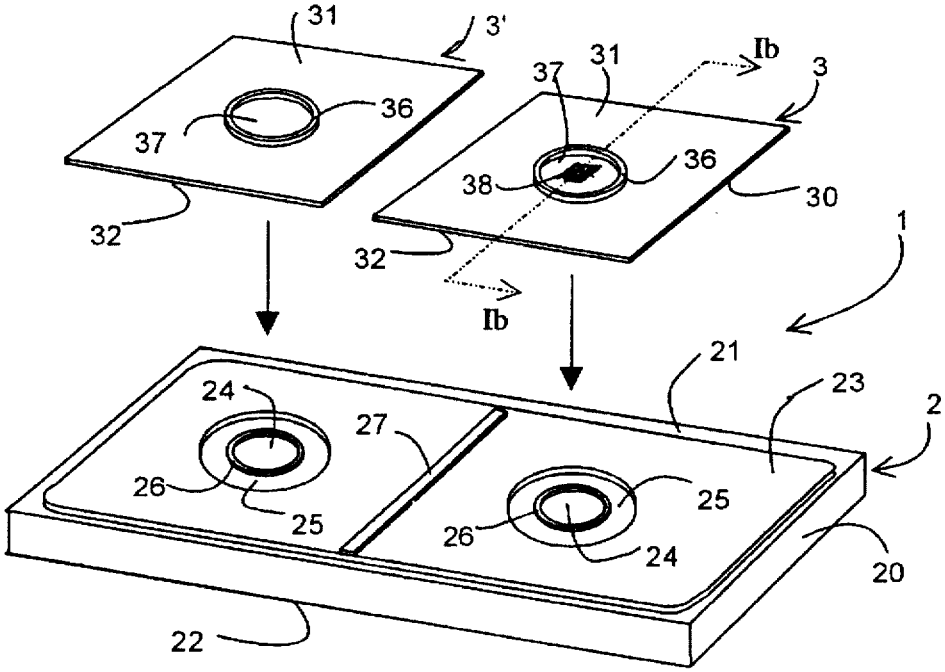
FIG. 1a is a perspective view of the biological assembly in accordance with the present invention.
Figure 1B:
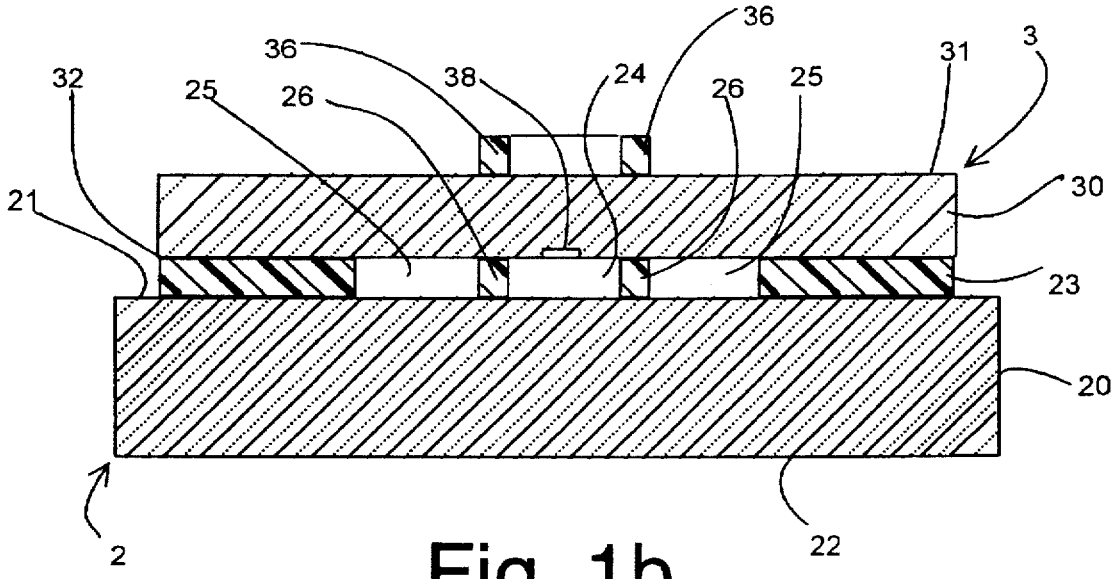

As shown in FIGS. 1a and 1b, the biological assembly 1 includes a slide 2 and slide covers 3, 3'. The slide 2 includes a substrate 20 preferably made of glass and which is transparent to allow light to pass therethrough for observation with a microscope. The substrate 20 has a top surface 21 and a bottom surface 22. On top surface 21 is a thin film 23 which is opaque and which has a given height, which is preferably 10, 20 or 50 μm.

The slide includes at least one sample chamber 24 surrounded by an overflow chamber 25. The sample chamber 24 is formed by an opening in the thin film 23 and the overflow chamber 25 is also formed by an opening in the thin film 23The openings are configured to form a separating wall 26 between the overflow chamber 25 and the sample chamber 24. The separating wall preferably has a width of 200 to 800 μm. In the embodiment shown if FIG. 1a and 1b, the sample chamber is preferably circular in cross section and thus a cylindrical chamber whereas the overflow chamber is toroidal in cross section and is coaxial with the sample chamber. In the embodiment shown in FIG. 1a, two sample chambers and associated overflow chambers are utilized although slides can be produced with a single sample chamber and overflow chamber or with more than two, preferably three sample chambers and over flow chambers.

When two or more sample chambers are utilized, a separator 27 is disposed therebetween and having a height of approximately 100–500 μm.

The thin film 23 is preferably composed of an a photoresist, as disclosed in U.S. Pat. No. 4,911,782, an epoxy or a hydrophobic ink and is either printed on or patterned by other conventional methods as disclosed in U.S. Pat. No. 4,911,782.

The biological assembly also includes a slide cover 3, 3', which is used to cover the sample in the sample chamber 24 during use of the slide in a microscope.

The slide cover 3 comprises a substrate 30, which is preferably made of a transparent glass 0.1 to 0.5 mm thick and has a top surface 31 and a lower surface 32, which is superposed on the upper surface of the thin film 23 during use as shown in FIG. 1b. The slide cover also includes a pattern of thin film material 36 disposed on the upper surface 31 and having a width of 200 to 800 μm. In the embodiment shown in FIG. 1a, the pattern 36 is identical to the separating wall 26 and is used to demarcate an area 37 therewithin and to permit alignment of the area 37 with the sample chamber 24 by matching the pattern 36 with the wall 26.

The slide cover 3 also includes a grid of perpendicular lines formed in the lower surface 32 of the slide cover substrate 30. This grid is preferably 10 boxes ×10boxes with each box being 0.1 mm on a side. The grid is formed in the surface of the substrate by a laser etching method called excimer laser micromachining, which produces a relatively thin grid lines. The grid formed by this method is almost invisible to the naked eye.

The slide cover 3' shown in FIG. 1a is identical to the slide cover 3 with the exception of the grid, which is not present in the area of 37. When the two slide covers are placed on the slide, the separator 27 keeps them apart.

Figure 2A:
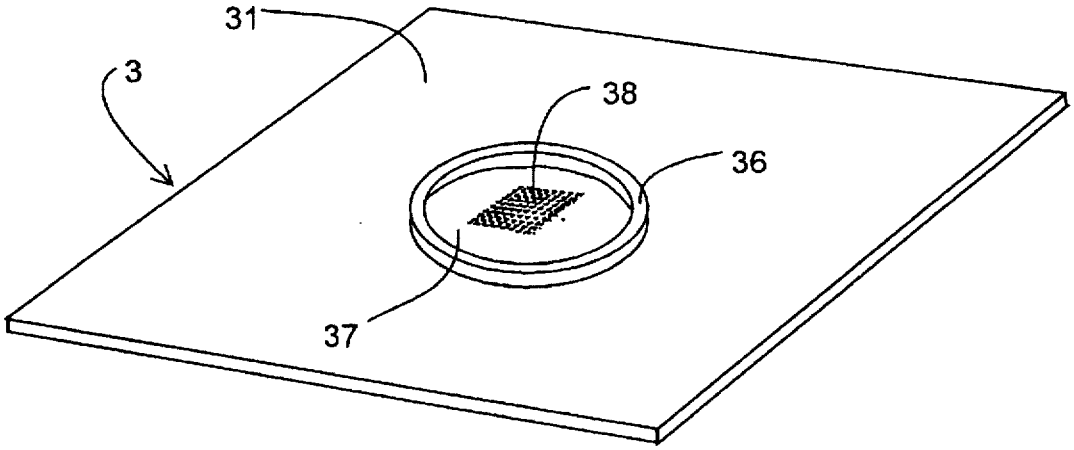
Figure 2B:
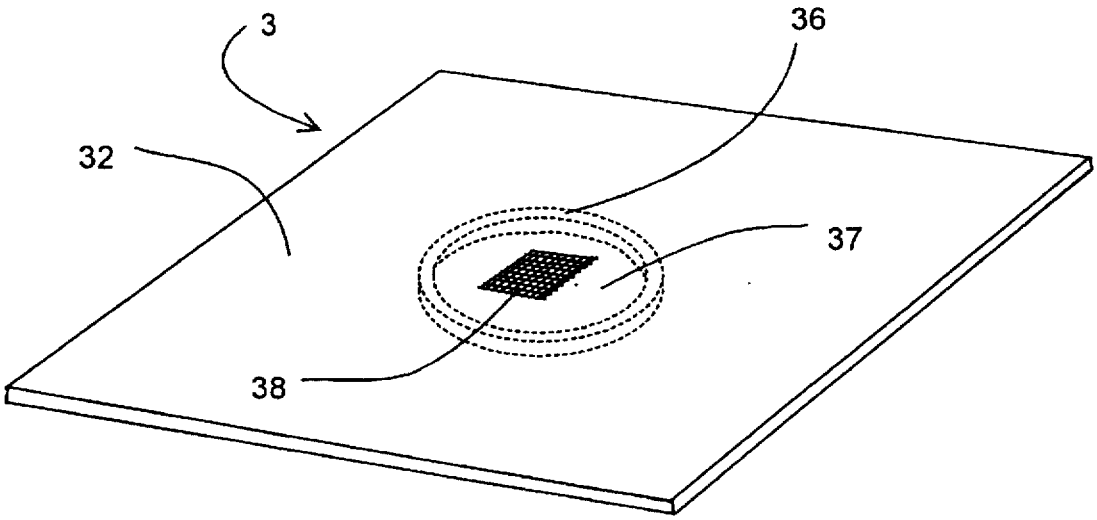

FIGS. 2a and 2b show the slide cover of a FIG. 1a and 1b in more detail.

The slide cover of FIG. 2a and 2b can be used independently of the slide 2 shown in FIGS. 1a and 1b and can thus be used with other slides having predefined chambers.

The grid is etched into the lower surface of the slide cover to bring the grid as close as possible to the sample, in order to produce the most accurate results since it substantially eliminates parallax.

In use, the user drops a liquid sample into the sample chamber 24. Any of the sample which exceeds the volume of the sample chamber 24 will flow into the overflow chamber 25. Thereafter, the slide cover 3 is applied to the top of the slide by aligning the pattern 36 with the separating wall 26. When viscous fluids are used, the placing of the slide cover on the slide will force excess fluid into the overflow chamber. The grid 38 is now disposed immediately adjacent to the sample in sample chamber 24 as can be seen in FIG. 1b and the slide is introduced into a microscope so that the user can count the chamber of cells within a representative one of the squares of the grid pattern 38.

Figure 3A:
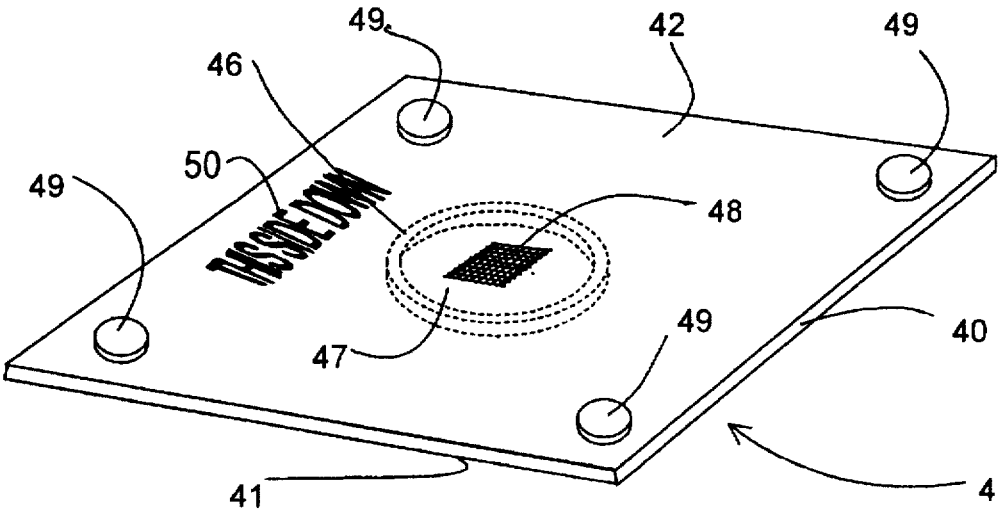
FIG. 3a is a perspective view of an alternative embodiment of the slide cover in accordance with the present invention.
Figure 3B:
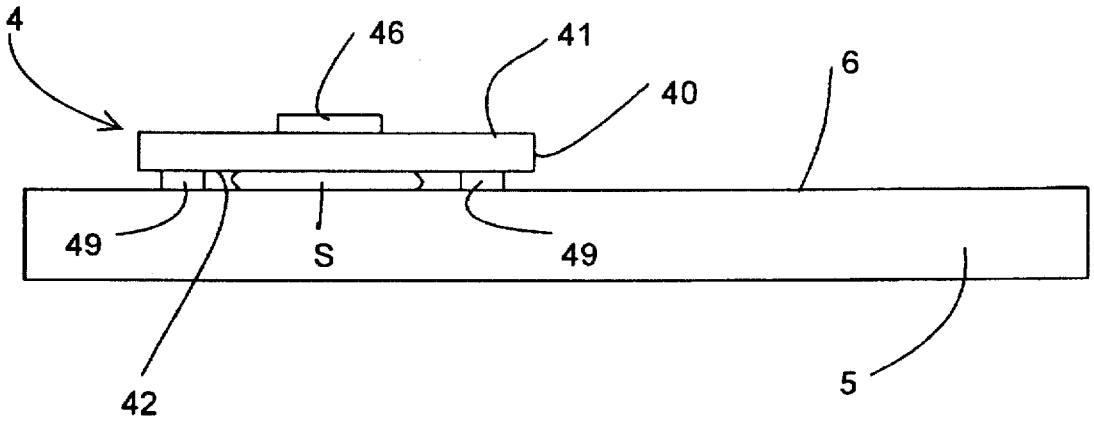
FIG. 3b is a side view of the slide cover of FIG. 3a in use on a conventional slide.

In an alternative embodiment of the present invention as shown in FIGS. 3a and 3b, the slide cover 4 can be used with conventional slides having no chambers formed thereon. In this embodiment, the substrate 40 has the pattern 46 printed on the upper surface 41 thereof. On the lower surface 42, the grid 48 is formed therein in the area 47 demarcated by the pattern 46. Disposed outside of the area 47 are thin film segments 49, which have the function of spacers, and which space the surface 42 of the slide cover from the upper surface 6 of a conventional slide 5 shown in FIG. 3b. The spacers 49 are made of thin film and have a thickness of preferably 10, 20 or 50 μm. The cover 4 also has indicia 50 indicating which side thereof the grid is on, to aid the user.

As shown in FIG. 3b, a sample S is placed on the surface 6 of a slide 15 and the slide cover 4 is disposed thereover with the spacers 49 resting on the surface 6. As a result of the fact that the spacers spaced the surface 42 a fixed distance from the top surface of the slide, a known volume of sample S is disposed within the confines of the grid 48, thus enabling measurements to be made.

Figure 3C:
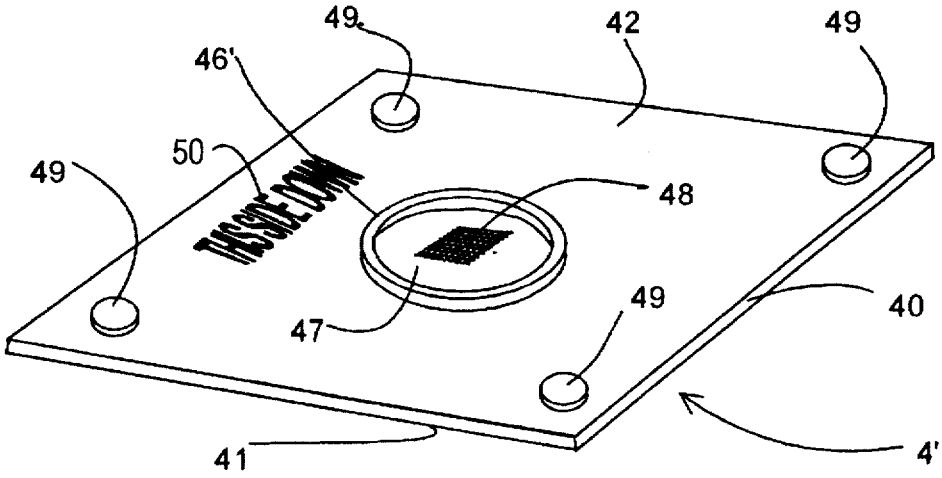
FIG. 3c is a perspective view of another embodiment of the slide cover.

In FIG. 3c, the slide cover 4' has the pattern 46' disposed on the lower surface 42. In this embodiment, the pattern itself can act as a spacer and accordingly, the diameter of the pattern 46' can be made greater to provide stability, so that the film segment spacers 49 can be eliminated.

Figure 4:
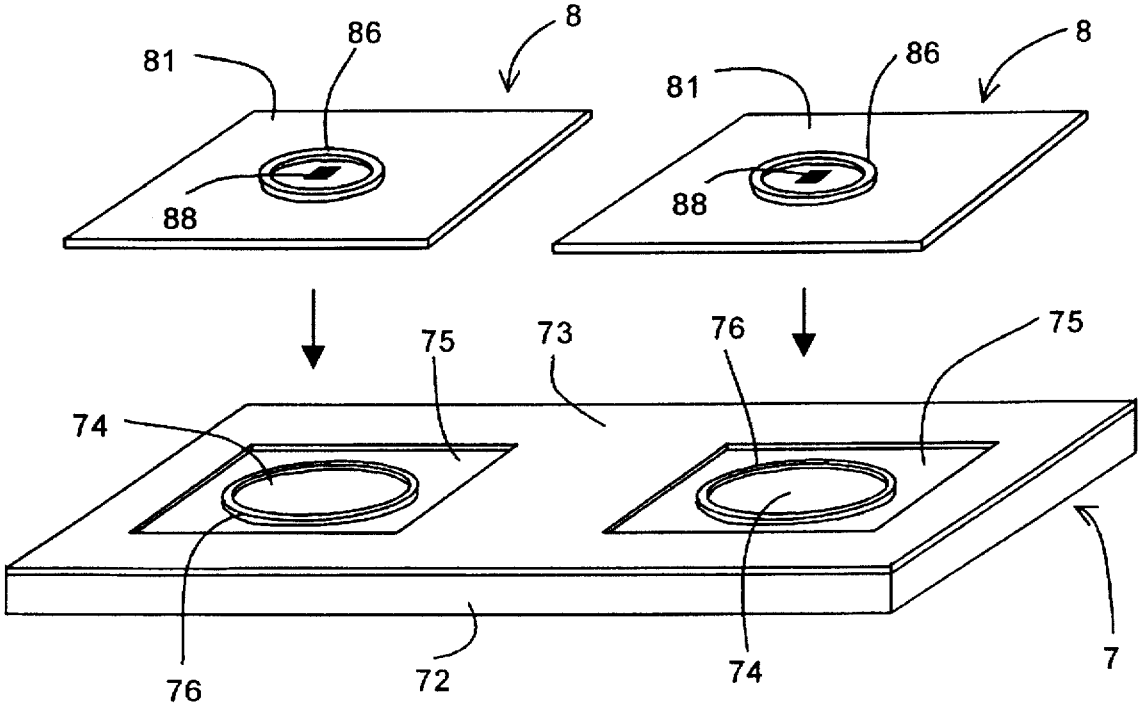
FIG. 4 is a perspective view of a further embodiment of the present invention.

In a further embodiment shown in FIG. 4, the biological assembly includes a slide 7 and slide covers 8. The slide includes a substrate 72 of transparent glass which is preferably 75 mm long and 25 mm wide and 1 mm thick. The top surface of substrate 72 is covered with thin film 73 having a height of preferably 10, 20 or 50 μm and openings therein demarcating cylindrical sample chambers 74 and rectangular overflow chambers 75 and forming circular separating walls 76 preferably having a width of 700 to 800 μm.

The cylindrical sample chambers 74 preferably have a diameter of 16 mm. The rectangular overflow chambers 75 are preferably 23 mm long and 10 mm wide. For a thin film of 20 mm, the sample chamber has a volume of 4 μl and the overflow chamber has a volume of 5 μl. The slide covers 8 comprise a substrate 81 of transparent glass which has a grid 88 etched into the lower surface thereof at a location within the circular pattern 86 which is disposed on the upper surface of substrate 81. The substrate is preferably 27 mm long and 22 mm wide and 0.33 mm thick and the pattern 86 and grid 88 are positioned to fall at the center of the sample chamber 74 when the slide cover is disposed on the slide with the edges of the slide cover coaxial with the edges of the sample chamber.

When thin film 73 is hydrophobic, any excess liquid which exceeds the overflow chamber 75, will be limited in its migration.

It is understood that the present invention is not limited to the particular embodiments illustrated and described hereinabove but that various changes and modifications may be made without departing from the spirit and scope of the invention as defined in the claims.

What is claimed is:

1. A biological assembly for effecting the examination of a sample in a liquid medium under magnification, comprising:

a transparent substrate having a first main surface;

means forming at least one sample chamber and an immediately adjacent overflow chamber on the first main surface and receptive of a sample in a liquid medium, said means comprising a thin film having for each sample chamber and overflow chamber, means defining a first opening therein corresponding to the sample chamber and means defining a second opening surrounding the first opening and corresponding to the overflow chamber, wherein the first and second openings form a separating wall of thin film therebetween; and a transparent cover having first main surface superposable on the thin film to cover the at least one sample chamber and overflow chamber when a sample is received therein, wherein the cover has a second main surface opposite the first main surface and having a thin film pattern thereon demarcating an area for aligning the area of the cover with the at least one sampling chamber.

2. The biological assembly according to claim 1, wherein the first opening is circular and the second opening is toroidal.

3. The biological assembly according to claim 1, wherein the first opening is circular and the second opening is rectangular.

4. The biological assembly according to claim 1, wherein the thin film has a height of from 10 to 50 μm.

5. The biological assembly according to claim 1, wherein the separating wall has a width of 200 to 800 μm.

6. The biological assembly according to claim 1, wherein said at least one sample chamber has a volume of 2 to 15 μl.

7. The biological assembly according to claim 1, wherein the thin film pattern is identical in configuration to said separating wail.

8. The biological assembly according to claim 1, wherein the cover has a grid pattern in the first main surface within the area demarcated by said thin film pattern.

9. The biological assembly according to claim 1, wherein the thin film comprises at least one of a photoresist, an epoxy and a hydrophobic ink.

10. A biological assembly for effecting examination of a sample in a liquid medium under magnification, comprising:

a transparent substrate having a first main surface;

means forming at least one sample chamber on the first main surface and receptive of a sample in a liquid medium, said means comprising a thin film having for each sample chamber, means defining an opening therein corresponding to the sample chamber and means defining a open area surrounding the opening, wherein the opening and open area form a separating wall of thin film therebetween; and a transparent cover having fast main surface superposable on the thin film to cover the at least one sample chamber when a sample is received therein, wherein the cover has a second main surface opposite the first main surface and having a thin film pattern thereon demarcating an area for aligning the area of the cover with the at least one sampling chamber.

11. The biological assembly according to claim 10, wherein the opening is circular.

12. The biological assembly according to claim 10, wherein the thin film has a height of from 10 to 50 μm.

13. The biological assembly according to claim 10, wherein the separating wall has a width of 200 to 800 μm.

14. The biological assembly according to claim 10, wherein said at least one sample chamber has a volume of 2 to 15 μl.

15. The biological assembly according to claim 10, wherein the thin film pattern is identical in configuration to said separating wail.

16. The biological assembly according to claim 10, wherein the cover has a grid pattern in the first main surface within the area demarcated by said thin film pattern.

17. The biological assembly according to claim 10, wherein the thin film comprises at least one of a photoresist, an epoxy and a hydrophobic ink.

*18. A biological assembly for effecting examination of a sample in a liquid medium under magnification, comprising:*

*a transparent substrate having a surface for receiving the sample;*

*a transparent cover having a first main surface superposed on the surface of the substrate during use and comprising a grid pattern and spacers disposed outwardly of the grid pattern for spacing the first main surface apart from the substrate surface by a distance when the cover is superposed on the substrate and a second main surface opposite the first main surface and having a first thin film pattern thereon demarcating an area including the grid pattern for aligning the grid pattern over the sample when the cover is superposed on the substrate.*

*19. The biological assembly according to claim 18, wherein the first thin film pattern is a ring surrounding the grid pattern.*

*20. The biological assembly according to claim 18, wherein the spacers comprise a second thin film pattern on the first main surface.*

*21. The biological assembly according to claim 20, wherein the second thin film pattern comprises circles in corners of the cover.*

*22. The biological assembly according to claim 18, wherein the spacers space the first main surface from the substrate surface by 10 microns.*

*23. The biological assembly according to claim 18, wherein the spacers space the first main surface from the substrate surface by 20 microns.*

*24. The biological assembly according to claim 18, wherein the spacers space the first main surface from the substrate surface by 50 microns.*

*25. A biological assembly for effecting examination of a sample in a liquid medium under magnification comprising:*

*a transparent slide having a completely planar surface for receiving the sample;*

*a transparent slide cover having a first main surface superposed on the surface of the slide during use and comprising a grid pattern, a thin film pattern demarcating an area including the grid pattern for aligning the grid pattern over the sample when the slide cover is superposed on the slide and a plurality of discrete spacers disposed outwardly of and separated from the thin film pattern without enclosing same for spacing the first main surface apart from the slide surface by a distance when the slide cover is superposed on the slide.*

*26. The biological assembly according to claim 25, wherein the thin film pattern is a ring surrounding the grid pattern.*

*27. The biological assembly according to claim 25, wherein the spacers space the first main surface from the slide surface by 10 microns.*

*28. The biological assembly according to claim 25, wherein the spacers space the first main surface from the slide surface by 20 microns.*

*29. The biological assembly according to claim 25, wherein the spacers space the first main surface from the slide surface by 50 microns.*

* * * * *